United States Patent
Wengler, III et al.

(10) Patent No.: US 10,618,635 B2
(45) Date of Patent: Apr. 14, 2020

(54) PILOT ACTIVATED TRIM FOR FLY-BY-WIRE AIRCRAFT

(71) Applicant: Sikorsky Aircraft Corporation, Stratford, CT (US)

(72) Inventors: Leonard M. Wengler, III, Palm City, FL (US); Kevin L. Bredenbeck, Stuart, FL (US); Matthew T. Luszcz, Hamden, CT (US); Matthew A. White, Milford, CT (US); William Fell, Stuart, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 497 days.

(21) Appl. No.: 15/404,804

(22) Filed: Jan. 12, 2017

(65) Prior Publication Data
US 2017/0197705 A1 Jul. 13, 2017

Related U.S. Application Data

(60) Provisional application No. 62/278,220, filed on Jan. 13, 2016.

(51) Int. Cl.
*G05D 1/06* (2006.01)
*G05D 1/08* (2006.01)
(Continued)

(52) U.S. Cl.
CPC ........ *B64C 13/044* (2018.01); *B64C 13/0427* (2018.01); *B64C 13/503* (2013.01);
(Continued)

(58) Field of Classification Search
CPC ....... B64C 13/00; B64C 13/04; B64C 13/042; B64C 13/0421; B64C 13/0423;
(Continued)

(56) References Cited

U.S. PATENT DOCUMENTS

| 4,603,388 | A | * | 7/1986 | Griffith | ................ | G05D 1/0669 244/17.13 |
| 5,001,646 | A | * | 3/1991 | Caldwell | .............. | G05D 1/0061 701/3 |

(Continued)

FOREIGN PATENT DOCUMENTS

| EP | 2672357 A1 | 12/2013 |
| WO | 2008108787 A2 | 9/2008 |

OTHER PUBLICATIONS

The extended European search report; European Application No. 17151148.8; dated Jun. 6, 2017; pp. 1-8.
(Continued)

*Primary Examiner* — Philip J Bonzell
*Assistant Examiner* — Tye William Abell
(74) *Attorney, Agent, or Firm* — Cantor Colburn LLP

(57) ABSTRACT

A fly-by-wire aircraft and method of flying a fly-by-wire aircraft is disclosed. The aircraft includes a control system for flying the aircraft in one of a proportional ground control mode and a model following controls mode. A control device at a control interface of the aircraft selectively activates a trim follow up function in the control system. When flying the aircraft in a proportional ground control mode, trim follow up function can be activated. The control system can then transition into the model following controls mode with the trim follow up function activated to reduce transient behavior.

13 Claims, 2 Drawing Sheets

(51) Int. Cl.
*B64C 13/04* (2006.01)
*B64C 13/50* (2006.01)
*B64C 27/04* (2006.01)

(52) U.S. Cl.
CPC ......... *B64C 13/506* (2018.01); *G05D 1/0669* (2013.01); *G05D 1/0858* (2013.01); *B64C 27/04* (2013.01)

(58) Field of Classification Search
CPC . B64C 13/0425; B64C 13/0427; B64C 13/08; B64C 13/50; B64C 13/503; B64C 13/504; B64C 13/505; B64C 13/506; B64C 13/507; G05D 1/0858; G05D 1/0669
See application file for complete search history.

(56) References Cited

U.S. PATENT DOCUMENTS

| | | | | |
|---|---|---|---|---|
| 5,446,666 A | * | 8/1995 | Bauer | B64C 13/503 701/4 |
| 5,493,497 A | * | 2/1996 | Buus | G05D 1/0077 701/4 |
| 5,596,499 A | * | 1/1997 | Glusman | G05D 1/0858 700/78 |
| 7,742,846 B2 | | 6/2010 | Fanciullo et al. | |
| 8,231,085 B2 | | 7/2012 | Cherepinsky | |
| 2007/0282493 A1 | * | 12/2007 | Fanciullo | G01C 23/00 701/4 |
| 2012/0072056 A1 | * | 3/2012 | Hasan | B64C 13/00 701/3 |
| 2013/0325221 A1 | * | 12/2013 | Shue | G05D 1/0858 701/16 |

OTHER PUBLICATIONS

Carl J. Bauer: "A Landing and Takeoff Control Law for Unique-Trim, Fly-by-wire Rotorcraft Flight Control Systems", Nineteenth European Rotorcraft Forum Paper n° H1O Sep. 14-16, 1993 Cernobbio (Como) Italy Associazione Industrie, Sep. 14, 1993 (Sep. 14, 1993), pp. 1-9, XP055517656, Retrieved from the Internet: URL:https://dspace-erf.nlr.nl/xmlui/handle/20.500.11881.2328 [retrieved on Oct. 22, 2018].

* cited by examiner

PILOT ACTIVATED TRIM FOR FLY-BY-WIRE AIRCRAFT

CROSS REFERENCE TO RELATED APPLICATIONS

The present invention claims priority to U.S. Provisional Application Ser. No. 62/278,220, filed Jan. 13, 2016, the contents of which are incorporated herein by reference in their entirety

BACKGROUND OF THE INVENTION

The present invention is directed to aircraft flight control systems and, in particular, to reducing the occurrence of transient behavior at a control interface or an aircraft while transitioning between operating modes of the aircraft.

Fly-by wire (FBW) control systems are increasingly employed in the control of rotary-wing aircraft. Such FBW systems allow the aircraft to operate in one or more operational modes. In a ground control proportional mode, a pilot moves a control device, such as a cyclic, collective or pedals, and an aircraft flight control surface such as a swashplate or servo moves in direct proportion to the movement of the control device. In a model following controls operational mode, a movement of the control device indicates a desired response of the aircraft. The desired response is interpreted by a control system which determines a configuration of the flight control surface that produces the desired response. When transitioning from the ground control proportional mode to the model-following controls mode, a trim condition of the aircraft is taken from the control device (i.e., the cyclic) and is faded into a trim integrator of the control system. This transition usually introduces a transient into the aircraft as a result of the proportional cyclic offset being faded into the trim.

Accordingly, it is desired to provide a transition between operational modes of the aircraft without the occurrence of transients at the control device.

SUMMARY OF THE INVENTION

According to one embodiment of the present invention, a method of flying a fly-by-wire aircraft, includes: flying the aircraft in a proportional ground control mode using a control interface of the aircraft; activating a trim follow up function at the control interface while flying the aircraft in the proportional ground control mode; and transitioning from the limited proportion ground control mode into a model following controls mode with the trim follow up function activated.

According to another embodiment of the present invention, a fly-by-wire aircraft includes: a control system for flying the aircraft in one of a proportional ground control mode and a model following controls mode; and a control device at a control interface of the aircraft for selectively activating a trim follow up function in the control system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
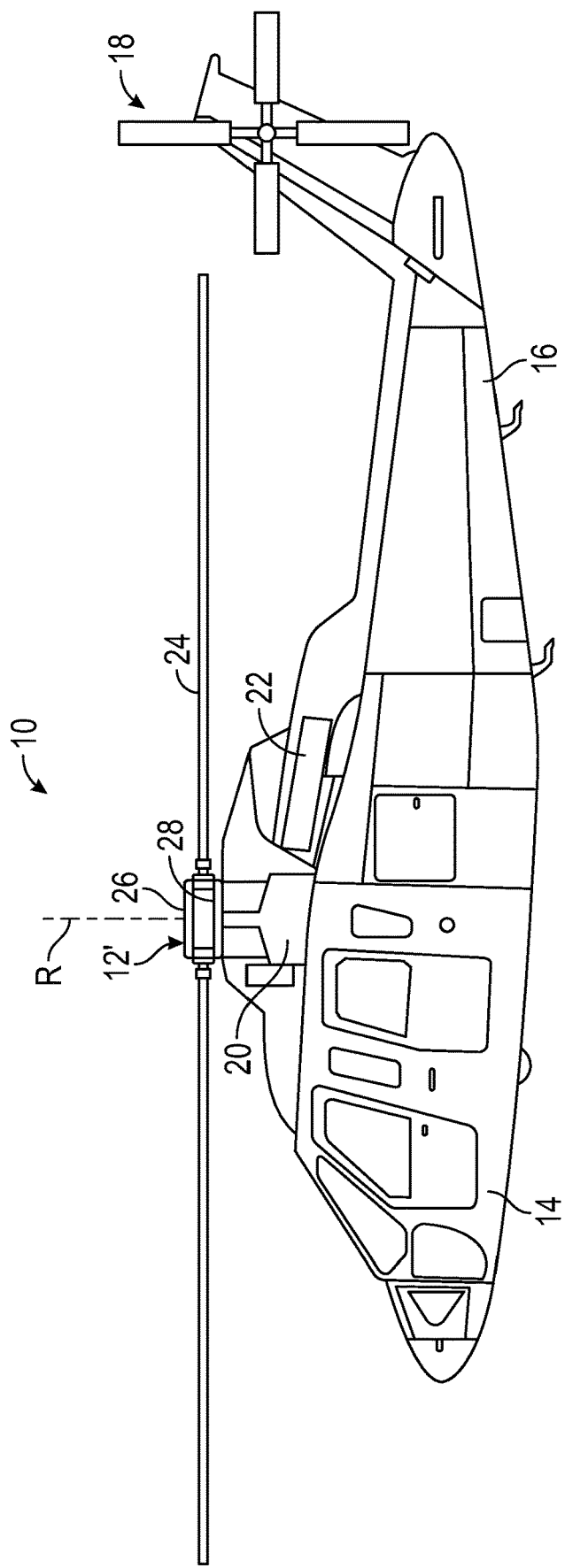
FIG. 1 schematically illustrates a rotary wing aircraft in accordance with one embodiment of the present invention.

Referring now to the Figures, where the invention will be described with reference to specific embodiments, without limiting same, FIG. 1 schematically illustrates a rotary wing aircraft 10 having a main rotor assembly 12. The aircraft 10 includes an airframe 14 having an extending tail 16 which mounts a tail rotor assembly 18, such as an anti-torque system, a translational thrust system, a pusher propeller, a rotor propulsion system, and the like. The main rotor assembly 12 is driven about an axis of rotation R through a gearbox (illustrated schematically at 20) by one or more engines 22. The main rotor assembly 12 includes a multiple of rotor blades 24 mounted to a rotor hub 26, and a swashplate 28 that is used to affect a state or orientation of the rotor blades 24. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention. Additional flight control surfaces can include servos, individual blade control actuators, on-blade flaps and/or slats, tail rotors, propellers, etc. Actuators of various types can be used in different embodiments of the aircraft. Some actuators may include: rockets, magneto/plasma thrusters, momentum-reaction wheels, control moment gyroscopes, nutation dampers, solar radiation pressure actuators, rotary pulse generators, and magnetic torquers.

The rotary wing aircraft 10 comes equipped with various control devices and a control system for flying the aircraft using FBW controls. Typical control devices include a cyclic inceptor, a collective inceptor and pedals. The commands provided by these control devices to the control system depend on the operational mode of the aircraft.

One operational mode of the control system is a proportional ground control mode. In the ground control mode, the cyclic inceptor is used to change a pitch angle of the rotor blades in a cyclical fashion to effectively tilt the rotor disk in a particular direction, resulting in the helicopter moving in that direction. In the same mode, a collective inceptor changes a pitch angle of the rotor blades 12 collectively, resulting in the helicopter increasing or decreasing its total lift derived from the rotor. Pedals serve to control a direction of the nose of the aircraft. The proportional ground control mode changes a position of a flight control surface of the aircraft in direct proportion to a movement of the control inceptor. For example, a position or orientation of a flight control surface such as swashplate 28 is in direct proportion to a position of the cyclic inceptor.

Another operational mode of the control system is a model following control mode. In the model following control mode, the control system receives input from a pilot inceptor such as the cyclic inceptor, performs various calculations on the received input using an inverse model of the aircraft, and then moves the flight control surface to the determined position. The pilot will often employ both of these flight control operational modes while flying the aircraft. Transitioning from the proportional ground control mode to the model following control mode can sometimes cause unwanted transients, particularly in high wind conditions.

While the model following control mode is useful during most flight conditions, it is generally untenable when the aircraft is on the ground when a pilot input commands a new attitude. The aircraft is constrained by the ground, therefore making the commanded attitude unachievable. The full authority nature of the FBW would feed in control inputs with the real potential of rolling the aircraft over. Therefore whenever a single wheel is constrained by the ground control system transitions from the model following control mode to the proportional ground control mode.

During ground operations, for example during taxi operations, the pilot may make inputs to transient control (i.e., cyclic, collective and pedals) with no intention of taking off. When a momentary transient input is desired, the proportional ground control mode and the absence of trim follow up provides the pilot with an awareness of a rotor state, thereby aiding aid pilot control. The pilot senses when the control system is to transition from the proportional ground control mode to the model following control mode or when the cyclic inceptor is to be sent to a new centered ground trim state and therefore can press a button to make these transitions.

The control devices perform different functions depending on the operational mode. For example, in order to maintain a flight control surface in a particular non-centered configuration using the proportional ground control mode, the cyclic inceptor can be held out of its detent (center) position. However, in a model following controls mode, the cyclic inceptor commands an aircraft state (i.e., rates, attitudes, positions, velocities, etc.), rather than a position of a flight control surface. The commanded state is fed into a control system 200. The flight control surface can then be commanded to a non-centered position by the control system 200, even while the cyclic inceptor is in detent position. The cyclic inceptor remains in the detent position unless a change is requested in the aircraft state, at which point the pilot moves the cyclic inceptor out of the detent position.

Figure 2:
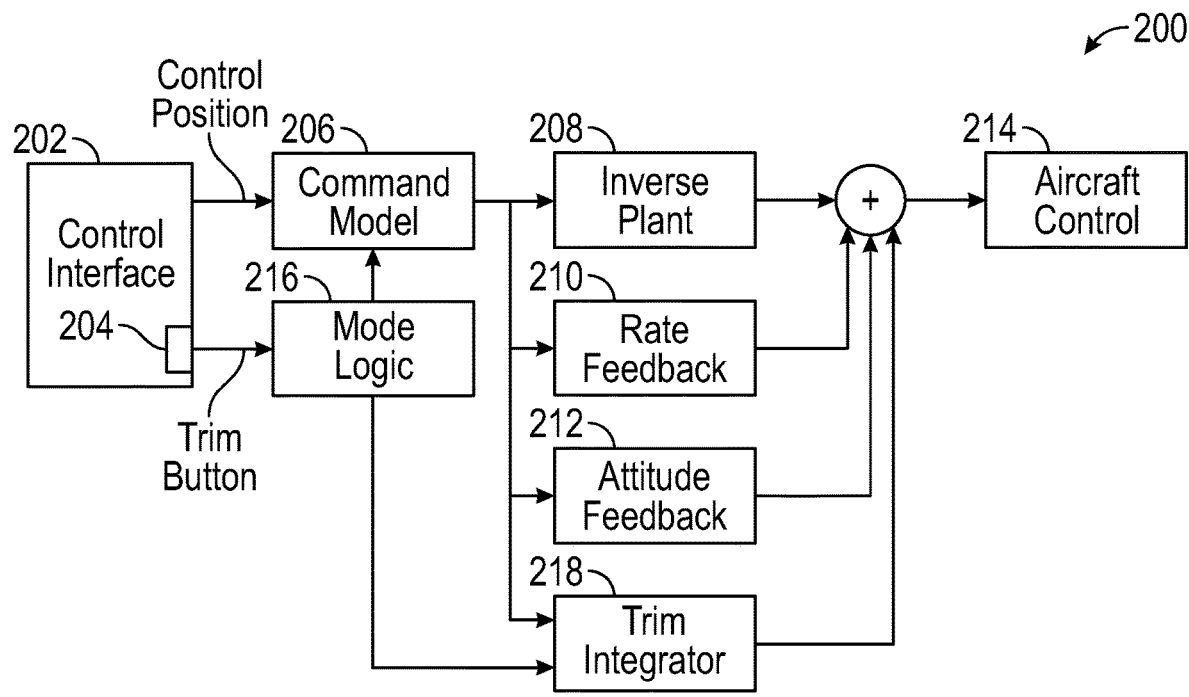
FIG. 2 shows a schematic representation of a control system for a fly-by-wire aircraft in accordance with one aspect of the present invention.

FIG. 2 shows a schematic representation of a control system 200 for a FBW aircraft in accordance with one aspect of the present invention. The control system 200 includes a pilot control interface 202 that includes various control devices accessible to the pilot. In one embodiment, the pilot control interface 202 includes a a cyclic inceptor. However, it is to be understood that the pilot control interface 202 also includes pedals, collective inceptor, etc.

The control system 200 is provided to fly the aircraft using a model following control mode. A position of the cyclic inceptor provides a control input to a command model 206. The command model 206 determines a commanded response of the aircraft (e.g., selected attitude, airspeed, vertical velocity, angular rates, altitude, etc.) from the control input. The command response is then fed into an inverse model 208 of the aircraft. The inverse model 208 of the aircraft determines a desired state of the aircraft 10 (i.e., a configuration of one or more flight surfaces of the aircraft 10) that will obtain the commanded response. The commanded response from the command model 206 is also provided to a rate feedback model 210 and an attitude feedback model 212. The rate feedback model 210 and attitude feedback model 212 provide information on a current state of the aircraft, e.g., its current attitude, airspeed, vertical velocity, angular rates, altitude, etc. A difference or error is determined between the desired state of the aircraft from the inverse model 208 and the current state of the aircraft (from the rate feedback model 210 and attitude feedback model 212). These differences, or errors, are synthesized to an aircraft control command 214. The aircraft control command 214 uses the determined errors to determine a change to one or more flight control surfaces of the aircraft that obtains the pilot's commanded response and then moves the flight control surfaces of the aircraft appropriately, thereby obtaining the desired state of the aircraft. When transitioning from a proportional ground control mode to a model following controls mode, a transient behavior occurs in the cyclic and other control devices.

In order to minimize this transient behavior, a trim follow up function is applied during the transition from proportional ground control operation mode to model following controls mode. The trim follow up function feeds input from the control devices to integrators to slowly translate the flight control position towards the controller position. In this scheme, the controller eventually returns to detent, while the flight control surface remains in the new trimmed state. The pilot can depress button 204 to implement the trim follow up function. The button 204 is shown located on the cyclic 202, but can be located at any suitable location. When the button 204 is depressed, the command signal input from the control interface 202 is sent to both the command model 206 and a mode logic module 216, which implements the trim follow up function. The mode logic module 216 sends a signal to allow the trim follow up function to the trim integrator 218. The trim follow up function and command signals from the command model 206 are sent to a trim integrator 218, which Fades in the trim follow up function. The trim integrator 218 then provides a trim integration signal to the aircraft control command 220. The aircraft control command 220 also receives the desired state of the aircraft from the inverse model 208, rate feedback from the rate feedback model 210, and attitude feedback from the attitude feedback model 212.

Figure 3:
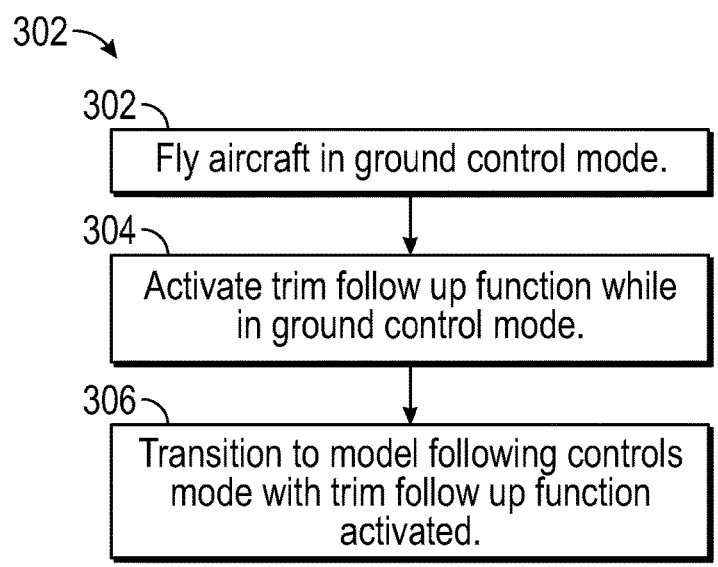
FIG. 3 shows a flowchart illustrating a method of transitioning between flight control modes of a fly-by-wire aircraft according to an embodiment of the present invention.

FIG. 3 shows a flowchart 300 illustrating a method of transitioning between flight control modes according to an embodiment of the present invention. In Box 302, the pilot flies the aircraft in proportional ground control mode. In Box 304, the pilot implements the trim follow up function by depressing button 204 while in proportional ground control mode. In Box 306, the pilot switches to model following control mode, so that the trim follow up function is integrated into the control system during the transition. In one embodiment, depressing button 204 both activates the trim follow up function and begins the transition into the model following controls mode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of flying a fly-by-wire aircraft, comprising:
flying the aircraft in a ground control mode using a control interface of the aircraft;

activating a trim follow up function at the control interface while flying the aircraft in the proportional ground control mode; and transitioning from the ground control mode into a model following control mode with the trim follow up function activated, wherein the model following control mode operates the aircraft via an inverse model and transitioning to the model following control mode causes a transient behavior in a control device of the aircraft based on a difference between a current state of the aircraft and a desired state of the aircraft from the inverse model;

wherein activating the trim follow up function reduces the transient behavior in the control device during the transition from the ground control mode to the model following control mode.

2. The method of claim 1, further comprising activating the trim follow up function and transitioning to the model following control mode using a single command from the control interface.

3. The method of claim 1, further comprising activating the trim follow up function at the control interface of the aircraft.

4. The method of claim 3, further comprising activating the trim follow up function by depressing a button at the control interface.

5. The method of claim 1, wherein activating the trim follow up sends a command input from the control interface to a mode logic module of a control system of the aircraft and the mode logic module provides a trim follow up function.

6. The method of claim 5, wherein activating the trim follow up further comprises activating a trim integrator in the control system, wherein the mode logic module sends a signal to allow the trim follow up function to the trim integrator and the trim integrator fades in the trim follow up function.

7. The method of claim 6, wherein the trim follow up function is determined from a commanded state of the aircraft.

8. A fly-by-wire aircraft, comprising:
a control system for flying the aircraft in one of a ground control mode and a model following control mode that operates the aircraft via an inverse model; and
a control device at a control interface of the aircraft that undergoes a transient behavior during a transition from the ground control mode and the model following control mode based on a difference between a current state of the aircraft and a desired state of the aircraft from the inverse model; and
a button for activating a trim follow up function to reduce the transient behavior of the control device during the transition from the ground control mode to the model following control mode.

9. The aircraft of claim 8, wherein the trim follow up function is activated while the aircraft is flying in the ground control mode and the control system transitions into the model following control mode while the trim follow up function is activated.

10. The aircraft of claim 8, wherein the control interface further includes a cyclic inceptor.

11. The aircraft of claim 8, wherein the control device further includes a button for selectively activating the trim follow up function.

12. The aircraft of claim 8, wherein the control system includes a mode logic module and a trim integrator that are implemented into the control system when the trim follow up function is activated.

13. The aircraft of claim 12, wherein the mode logic module receives a command signal from the control interface and provides the trim follow up function to the trim integrator.

* * * * *